United States Patent
Chansavoir et al.

(10) Patent No.: US 7,125,117 B2
(45) Date of Patent: Oct. 24, 2006

(54) OPTHALMIC LENS PREFORM

(75) Inventors: Alain Chansavoir, Dampierre (FR); Eric Comte, Thorigny sur Marne (FR); Frank Paggetti, Gonesse (FR); Jean Francois Belly, Choisy le Roi (FR)

(73) Assignee: Essilor International(FR)

( * ) Notice: Subject to any disclaimer, the term of this patent is extended or adjusted under 35 U.S.C. 154(b) by 0 days.

(21) Appl. No.: 10/466,532

(22) PCT Filed: Jan. 22, 2002

(86) PCT No.: PCT/FR02/00248

§ 371 (c)(1),
(2), (4) Date: Nov. 6, 2003

(87) PCT Pub. No.: WO02/058920

PCT Pub. Date: Aug. 1, 2002

(65) Prior Publication Data

US 2004/0066487 A1 Apr. 8, 2004

(30) Foreign Application Priority Data

Jan. 23, 2001 (FR) .................................. 01 00868

(51) Int. Cl.
*G02C 7/02* (2006.01)
(52) U.S. Cl. ...................................... 351/159
(58) Field of Classification Search .............. 351/159, 351/177, 178, 168, 169
See application file for complete search history.

(56) References Cited

U.S. PATENT DOCUMENTS

| 3,577,690 | A | | 5/1971 | Catron |
| 3,962,833 | A | * | 6/1976 | Johnson .................... 451/42 |
| 4,441,795 | A | * | 4/1984 | Lobdell .................... 351/169 |
| 6,011,630 | A | | 1/2000 | Shanbaum et al. |

FOREIGN PATENT DOCUMENTS

| EP | 0 657 246 | 6/1995 |
| FR | 2 755 631 | 5/1998 |
| JP | 05 124824 | 5/1993 |

* cited by examiner

*Primary Examiner*—Scott J. Sugarman
(74) *Attorney, Agent, or Firm*—Fish & Richardson P.C.

(57) ABSTRACT

The invention concerns an ophthalmic lens preform having intrinsically at least a mechanical angular indexing member (7, 8). It is applicable to the manufacture of lenses in mineral or organic material.

24 Claims, 2 Drawing Sheets

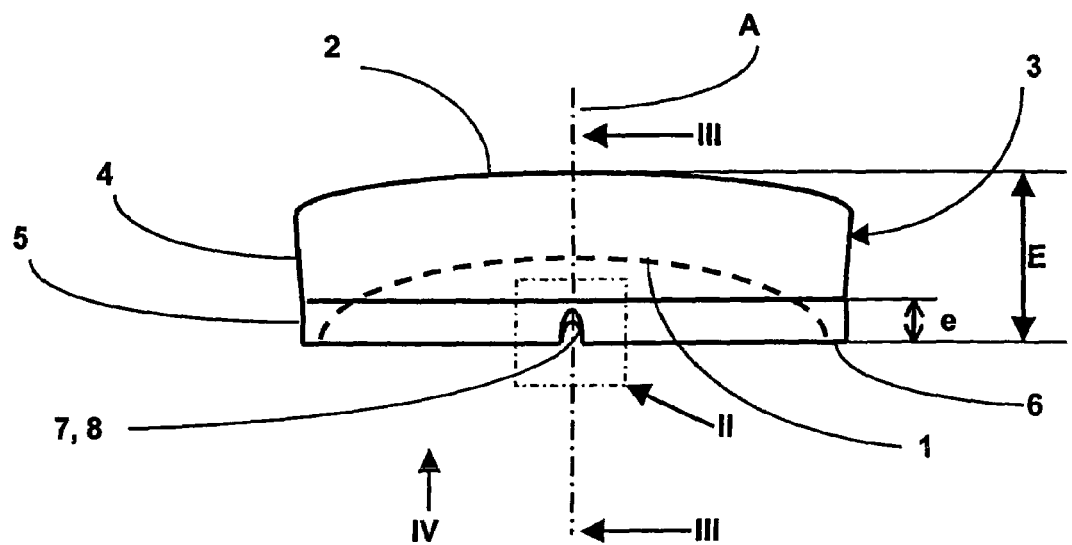
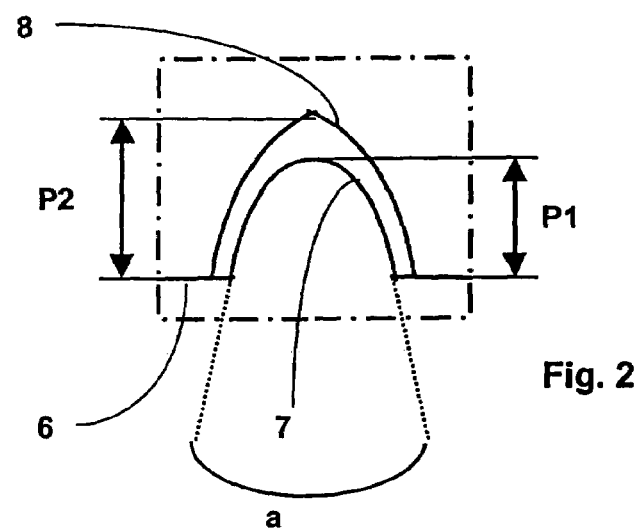
Fig. 1
Fig. 2

OPTHALMIC LENS PREFORM

The present invention relates, generally, to the production of ophthalmic lenses more commonly known as spectacle lenses. In relates more specifically to a lens preform in the form of an unfinished blank arising from molding—in a synthetic or glass material—and from which a finished lens producing the prescribed optical correction is obtained by removal of material, i.e. surfacing operations.

The ophthalmic lens production process generally comprises two main steps.

First, a blank or preform is obtained by molding the synthetic or glass material selected to constitute the basic substrate of the lens. Each mold employed for this operation has a shape and dimensions designed to cover a certain range of prescriptions and can even, for the most common prescriptions, have been dedicated to the large scale production of finished lenses having surfaces directly shaped to the desired prescriptions. But for less common prescriptions and/or more generally with an aim to simplification and logistics and, as a corollary to this, to reducing the number of molding lines, it may be preferable to restrict molding lines to the large scale production of a reduced number of, or even one single, standard preforms. Such preforms, which are a sort of semi-finished lens blank, are then the object of a certain number of finishing operations to arrive at the finished lens having the optical properties specifically required.

Thus, in the second major operation, the blank from the molding operation is surfaced on one and/or the other face to correspond to the geometric design and prescribed correction. Because of the tight precision and quality of surface requirements that apply, this surfacing operation is split up into several sub-steps each involving a specific workstation, thereby requiring the lens to circulate during surfacing from one station to the other. We thus generally distinguished, for surfacing each face of the lens, one grinding station providing both rough cutting and finishing with two separate tools, and a polishing station optionally preceded by a buffing station. Between the stations, or following them, other workstations for the preform/lens (for example engraving, checking, etc stations) may be present. Work on the preform/lens on each of these supplementary stations, with accurate and controlled positioning, may prove to be necessary.

One of the problems most frequently encountered during this surfacing process and, more generally, work on the semi-finished lens, resides in the successive positioning and repositioning of the blank at each of its transfers from one station to the other. This recurring sub-operation of positioning and repositioning the workpiece, known more commonly as "blocking" the lens, is particularly delicate, expensive, and can frequently lead to inaccuracies of positioning. It will indeed be understood that the lens preform, of transparent synthetic or glass material, is relatively fragile and must be preserved from any marking, especially on that one of its two faces which is finished while work is proceeding on its other face. Further, and above all, the lens requires to be positioned highly accurately at each station, with a spatial orientation that is known in a reference frame determined for the station concerned. In particular, when handling progressive lenses in which symmetry of revolution is absent, the angular position of the blank about its central axis must be mastered accurately.

Several ways of "blocking" a semi-finished lens for working on it, and in particular surfacing it, are known. The most widely used and practical method at the present time consists in forming and securing by melting, on one of the faces of the lens, a securing metal block made from a low melting point alloy and having clasping means adapted to co-operate with jaw- or mandrel-type gripping members on the various workstations participating. This method is, overall, satisfactory, but suffers from several disadvantages.

It is, firstly, expensive and relatively tricky to implement. The low melting point alloys employed are in effect relatively expensive and should be considered as pollutants dangerous for the environment so much so that it is necessary, both for economic reasons as well as compliance with stricter environmental constraints, to arrange for careful recycling. But, even with effective recycling, loss of alloy by evaporation during melting cannot be avoided.

Further, apart from these economic and environmental aspects, each lens being surfaced needs to be transported from one station to the other with its holding block, which is a hindrance not only during transfer, but also on the occasion of possible storage or transport between two operations. There is a minimum time before the lens associated with its holding blocks required on a machining station (around 15 minutes), as well as a maximum time beyond which machining cannot be implemented (around 24 hours), these periods of time consequently setting constraints on the workflow for such lenses. Further, in the case of storage or prolonged waiting between two operations, it would be excessively costly to provide a number of holding blocks in progress equivalent to the number of lenses waiting. It thus becomes necessary sometimes, between two operations, to release the lens from its initial holding block in order to transfer, store or transport it more readily. It is then necessary, when the process starts again, to again associate it with a fresh holding block, with the practical difficulties arising therefrom, not only as regards softening the low melting point alloy but also as regards mastering geometrical aspects of further work on the lens blank, and the associated cost. It is indeed necessary, notably, as mentioned above, in the case of complex-surface lenses without symmetry of revolution, to know the relative geometry of the lens with respect to each workstation concerned and, at the same time, with respect to the holding block associated with the lens blank. It is consequently necessary to perform, in some manner, a reading of the face of the lens currently being finished. Such a reading constitutes, each time work is restarted on the lens, a supplementary complex, and consequently inaccurate and costly, operation.

Vacuum systems have also been proposed for blocking lens preforms. Such systems implement grasping means which, in order to constitute a type of suction cup, have a cavity surrounded by an annular seal against which the preform abuts in order to define together with the cavity and its seal, a chamber where a relative vacuum is set up via an associated vacuum pump. Although this does not have the same economic and environmental disadvantages as the molten block solution discussed above, this type of blocking is little used in practice, and has proved difficult to implement for complex (i.e. non spherical) surfaces with which the seal did not provide a sufficiently accurate abutment. Additionally, angular alignment, when this is provided, is done by bringing registration marks provided respectively on the preform and the suction cup into visual registration. This purely visual registration is a source of inaccuracy and/or complication when blocking the preform/lens.

The general aim of this invention is to facilitate these operations of positioning and repositioning semi-finished lens blanks or preforms, with constant geometry.

There is consequently proposed, according to the invention, an ophthalmic lens preform or blank which has, intrinsically, at least one element for mechanical angular registration.

It is thus possible, at each step in the work process, to employ this intrinsic registration element on the preform in combination with a mating element on the workstation concerned, to ensure positioning or repositioning of the preform with an accurate and known spatial orientation and in particular, angular registration in the workstation reference frame.

According to an advantageous characteristic, the preform has two diametrically opposed members for mechanical registration which are separated from each other by at least one of their dimensions. This increases the accuracy and reliability of alignment. The fact of the two registration elements being different avoids any possibility of a 180° or so angular positioning error of the preform.

In one embodiment offering considerable scope and great flexibility in use, the element for angular registration takes the form of a notch provided in the actual body of the preform. By the term "notch" we mean any mark whatever its form may be, taking the form of a hollow and not a projection. The registration element is consequently of a "subtractive" nature, which in particular allows it to be provided either directly by injection of the preform, or in a preparatory machining phase for materials which are not suitable for injection. Further, the absence of an external protuberance on the preform is of itself advantageous as such a protuberance could hinder manipulation and storage of the preform, as well as increase workstation cycle time (grinding in particular).

For a preform having two diametrically opposed registration notches, the two notches are preferably distinguished one from the other by their depth.

According to another advantageous characteristic of the invention, the preform has two main faces one of which is concave, a peripheral edge joining these two faces. Preferably, the notch, or at least one of the notches if several are provided, is arranged on the concave face, at the outer periphery thereof, which favors a more accurate axial positioning in view of its diameter.

For ease of manufacture and for greater efficiency of alignment, the notch is open inwardly at the concave face and outwardly on the edge of the preform. In a preferred embodiment, the notch has a V-shaped cross-section profile the direction of which is perpendicular to the central axis of the preform. This widened-out shape of the notch gives it self-centering capabilities (for angular self-centering of the preform), which facilitates positioning or repositioning of the preform, notably when it is being placed in position by an automatic loading unit. It may be desirable both in manufacture and in use, for the base of the notch to be smoothed off. For example, the bottom of the notch can have a circular cross section.

More precisely, the circular cross-section of the base of the notch has a radius of about 1.5 mm. The V-section arms of the notch make an angle of about 45° with each other.

According to a further advantageous characteristic of the invention, the edge of the preform is, overall, undercut (substantially conical) over its major portion, to allow it to be obtained by an injection/molding process, but has a substantially cylindrical clamping portion adjacent to the concave face, designed to allow the preform to be gripped and clamped at the various workstations concerned.

Typically, the thickness of the clamping portion of the preform edge is substantially less than one third of the total thickness of the edge. However, the thickness of the clamping portion of the edge will preferably remain greater than the depth of the notch, which opens out at this point as well as over its whole depth. The thickness is preferably greater than or equal to 5 mm.

According to a further advantageous characteristic of the invention, the concave face is bordered by a flat annular abutment rim allowing stable and accurate seating of the preform against a corresponding support surface of the workstation concerned. When the edge of the preform is provided with a cylindrical claming portion, the plane of the annular abutment rim is, in a preferred embodiment, perpendicular to the axis of this cylindrical clamping portion.

Further characteristics and advantages of the invention will become more clear from the description which follows of one particular embodiment, given by way of non limiting example.

Reference is made to the attached drawings in which:

FIG. 1 shows an ophthalmic lens preform according to the invention in profile.

FIG. 2 shows detail of the region II in FIG. 1.

Figure 3:
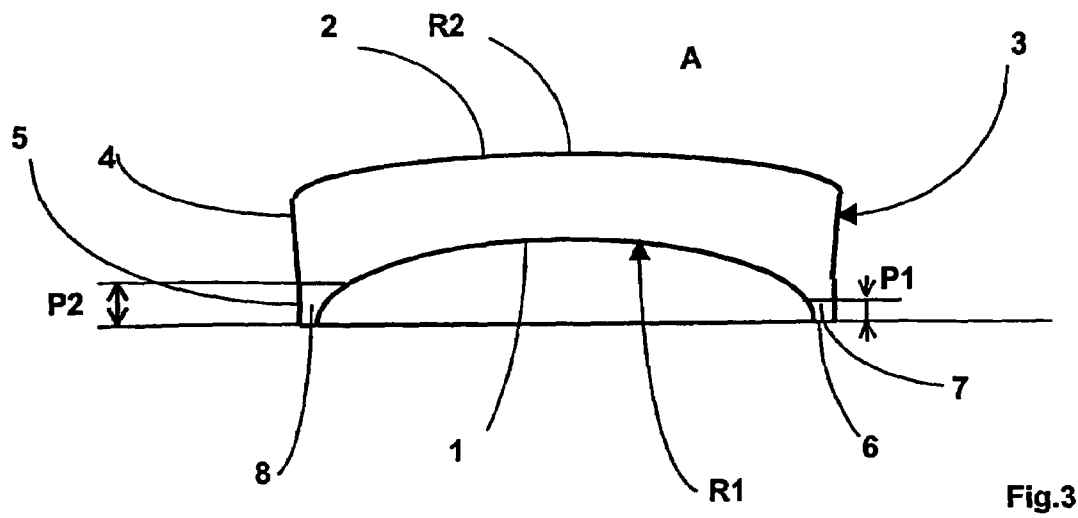
FIG. 3 shows a section along line III—III of FIG. 1.
Figure 4:
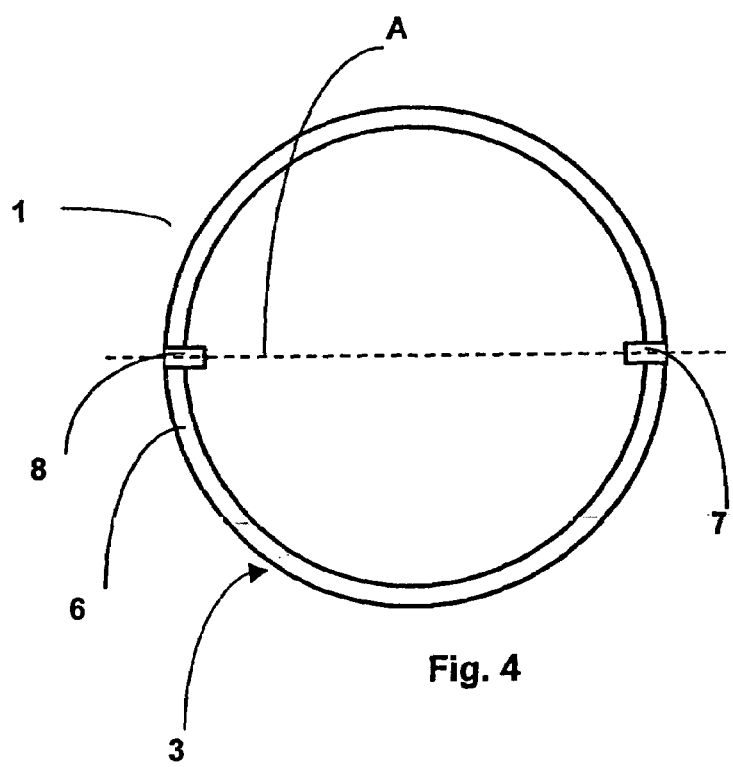
FIG. 4 is a plan view according to arrow IV in FIG. 1.

With reference to the drawings, an ophthalmic lens preform according to the invention has two principal faces, a concave face 1 and a convex face 2, and a peripheral edge 3 joining these two faces.

Conventionally, the edge of the preform is slightly conical, and consequently undercut, over the major portion 4 of its thickness, to allow injection/molding. Edge 3 has, over a minor proportion of its thickness, a substantially cylindrical clamping portion 5, adjacent to concave face 1.

Typically, the thickness e, of clamping portion 5 of edge 3 is substantially less than one-third of the total thickness, E, of said edge. Still, the thickness e of clamping portion 5 of edge 3 remains greater than the depth p1, p2 of each of the two notches 7, 8, which open out at this point as well as over their whole depth. In practice, the thickness e is preferably greater than or equal to 5 mm and in the example illustrated, is around 5 mm.

Concave face 1 is bordered by a flat annular abutment rim 6, allowing stable and accurate seating of the preform against a corresponding support surface on the workstation concerned. The plane of this annular abutment rim 6 is perpendicular to the axis of this clamping portion 5.

The preform further has two notches 7, 8 which, formed in the actual material of the preform, constitute intrinsic elements (i.e. integral, originating from injection/molding, or obtained previously by other means depending on the nature of the materials employed) for mechanical registration on a mating element on each one of the various workstations at which the preform needs to be positioned or repositioned. A notch here is any mark, whatever its shape may be, constituting a hollow and not a relief, of sufficient dimensions to mechanically co-operate with a matching registration element on the workstation concerned. Such mechanical co-operation should be clearly distinguished from optical co-operation. To get a clear idea, one should thus consider that the dimensions (length, width or diameter, and depth) of each notch are all greater than 1 mm.

Registration notches 7, 8 are diametrically opposed and are distinguished from each other by at least one of their dimensions, in the case considered here, their depth. Because of this arrangement on the outer diameter of the preform, accuracy and reliability of angular alignment are improved. The fact that the two registration elements are different avoids any possible angular positioning error of around 180°.

The registration notches 7, 8 are, in the case considered, provided on concave face 1, at the periphery thereof. For ease of manufacture and for greater alignment effectiveness, each notch opens inwardly at the concave face and externally at the edge of the preform.

More precisely, in the embodiments illustrated, each registration notch 7, 8 has a V-section in profile the direction of which is substantially perpendicular to the central axis of the preform. This widened-out form of the notch gives it a self-centering capability facilitating positioning or repositioning of the preform, with automatic angular alignment of the preform.

To facilitate manufacture and use, the base of the notch is rounded off and has, more precisely, a 1.5 mm radius circular section. The two arms of the V-section of each notch 7, 8 make an angle of 45° with each other.

Tests allowed us to determine the following advantageous geometrical characteristics, corresponding to those of the embodiment illustrated:

concave face 1, which is substantially spherical, has a radius r1 comprised between infinity (face 1 is then flat) and 50 mm, for example, as is the case here, about 71 mm;

convex face 2, which is substantially spherical, has a radius r2 comprised between 60 mm and infinity (face 2 is then flat), for example, as is case here about 301 mm and;

each registration notch 7,8 has a depth, referenced respectively p1, p2, comprised between 3 and 6 mm, and the difference in depth p2–p1 between the two notches 7 and 8 is at least 1 mm; for example, as is the case here, the two notches 7,8 have respective depths p1 and p2 of 3.4 and 4.4 mm, with the difference in depth (p2–p1) between the two notches being 1 mm;

the total thickness e of the edge 3 of the preform is comprised between 12 and 25 mm, for example, as is the case here, about 23.5 mm;

the diameter of the preform can vary between 60 and 100 mm depending on the diameter of the finished lenses employed (in particular, but not restrictively for reasons of material removal optimization), for example, as is the case here, about 81 mm.

The invention is not limited to the particular embodiments just described but covers, on the contrary, any alternative embodiment representing, with equivalent means, the essential characteristics thereof. In particular, although a preform or blank having two diametrically opposed registration notches which differ in depth from each other have been described and illustrated, it would be equally possible, without departing from the scope of the invention, to provide a preform or blank with two diametrically opposed notches which differed from each other in some other dimension (for example, their width or length) or, yet again, an odd number of notches (typically, one or three notches) automatically providing a definite registration over 360°, without possible error of around 180°.

The invention claimed is:

1. An ophthalmic lens preform or blank, having, intrinsically, at least one element for mechanical angular registration,
wherein the perform has two main faces, one of which is concave, and a peripheral edge joining the said two faces,
wherein the edge of the preform has a major portion and a clamping portion, with the major portion being undercut and the clamping portion being substantially cylindrical adjacent to the concave face.

2. The preform of claim 1, having two diametrically opposed elements for mechanical registration, said elements differing from each other by at least one of their dimensions.

3. The preform of claim 1, wherein said element is a notch formed in a body of said preform.

4. The preform of claim 2, wherein said elements are notches and differ from each other by their respective depths.

5. The preform of claim 1, wherein said element is a notch provided on the concave face, at the periphery thereof.

6. The preform of claim 5, wherein the notch opens inwardly at the concave face and outwardly at the edge of the preform.

7. The preform of claim 5, wherein the notch has a V-section profile the direction of which is substantially perpendicular to a central axis of the preform.

8. The preform of claim 7, wherein a base of the notch is smoothed off.

9. The preform of claim 8, wherein a base of the notch has a circular section.

10. The preform of claim 9, wherein the circular cross-section of the base of the notch has a radius of about 1.5 mm.

11. The preform of claim 7, wherein arms of the V-section of the notch make an angle with each other of about 45°.

12. The preform of claim 5, wherein the notch has a depth comprised between 3 and 6 mm.

13. The preform of claim 4, wherein each of said notches has a depth comprised between 3 and 6 mm and wherein the difference in depth between the two notches is at least 1 mm.

14. The preform of claim 1, wherein a thickness of the clamping portion of the edge is substantially less than one third of the total thickness of said edge.

15. The preform of claim 14, wherein the notch has a V-section profile the direction of which is substantially perpendicular to a central axis of the preform and wherein the thickness of the clamping portion of the edge is greater than the depth of the notch.

16. The preform of claim 14, wherein the thickness of the clamping portion of the edge is greater than or equal to 5 mm.

17. The preform of claim 16, wherein the thickness of the clamping portion of the edge is about 5 mm.

18. The preform of claim 1, wherein the periphery of the concave face is bordered by a flat annular abutment rim.

19. The preform of claim 18, wherein the flat annular abutment rim is perpendicular to the cylindrical clamping portion of the preform edge.

20. The preform of claim 1, wherein the other face of which is convex.

21. The preform of claim 20, wherein:
the concave face is substantially spherical and has a radius comprised between infinity and 50 mm;
the convex face is substantially spherical and has a radius comprised between 60 mm and infinity;
the total thickness of the edge of the preform is comprised between 12 and 25 mm.

22. The preform of claim 21, wherein:
the concave face has a radius of about 71 mm;
the convex face has a radius of about 301 mm;
the total thickness of the edge of the preform is about 23.5 mm
wherein the perform has two diametrically opposed elements for mechanical registration, each element being a notch, wherein the two notches have respective depths of 3.4 and 4.4 mm, whereby the difference in depth between the two notches is 1 mm.

23. The preform of claim 1, the diameter of which is comprised between 60 and 100 mm.

24. The preform of claim 2, wherein said element is a notch formed in a body of said preform.

* * * * *